US010138902B2

(12) United States Patent
Kilian et al.

(10) Patent No.: US 10,138,902 B2
(45) Date of Patent: Nov. 27, 2018

(54) FAN INCLUDING AT LEAST ONE COVER ELEMENT

(71) Applicant: Mahle International GmbH, Stuttgart (DE)

(72) Inventors: Joerg Kilian, Renningen (DE); Tobias Schmid, Leonberg (DE); Joerg Marquardt, Renningen (DE)

(73) Assignee: Mahle International GmbH (DE)

( * ) Notice: Subject to any disclaimer, the term of this patent is extended or adjusted under 35 U.S.C. 154(b) by 233 days.

(21) Appl. No.: 14/970,176

(22) Filed: Dec. 15, 2015

(65) Prior Publication Data

US 2016/0177973 A1 Jun. 23, 2016

(30) Foreign Application Priority Data

Dec. 17, 2014 (DE) ........................ 10 2014 226 298

(51) Int. Cl.
*F04D 17/16* (2006.01)
*F04D 29/42* (2006.01)
(Continued)

(52) U.S. Cl.
CPC ....... *F04D 29/665* (2013.01); *B60H 1/00471* (2013.01); *F04D 25/08* (2013.01);
(Continued)

(58) Field of Classification Search
CPC .... F04D 29/663; F04D 29/665; F04D 29/667; F04D 29/703; F04D 29/4213;
(Continued)

(56) References Cited

U.S. PATENT DOCUMENTS 1,931,692 A * 10/1933 Good ................... F04D 29/023
   415/143
2,411,816 A * 11/1946 Teague, Jr. ............. F04D 29/28
   415/121.2
(Continued)

FOREIGN PATENT DOCUMENTS

DE 4115171 A1 11/1992
DE 4230014 C1 3/1994
(Continued)

OTHER PUBLICATIONS

English machine translation of DE 20 2005 012 569 U1, Oct. 12, 2006.*
(Continued)

*Primary Examiner* — Christopher Verdier
(74) *Attorney, Agent, or Firm* — Fishman Stewart PLLC

(57) ABSTRACT

A fan for generating a gas flow for an air-conditioning system includes a housing having a pressure chamber and a suction chamber open to each other via a connecting opening. An impeller is arranged in the housing and includes an axial suction side arranged at the connecting opening and a radial pressure side arranged in the pressure chamber. An inlet and an outlet are disposed in the housing for communicating the gas flow. A fan cut-off is disposed on the housing between the pressure chamber and the outlet. At least one cover element is arranged in the inlet and axially spaced from the connecting opening to cover at least part of a flow cross-section of the inlet.

17 Claims, 5 Drawing Sheets

(51) Int. Cl.
*F04D 29/70* (2006.01)
*F04D 29/66* (2006.01)
*F04D 25/08* (2006.01)
*F04D 29/44* (2006.01)
*B60H 1/00* (2006.01)
*B60H 3/06* (2006.01)

(52) U.S. Cl.
CPC ..... *F04D 29/4213* (2013.01); *F04D 29/4226* (2013.01); *F04D 29/441* (2013.01); *F04D 29/663* (2013.01); *F04D 29/703* (2013.01); *B60H 2001/006* (2013.01); *B60H 2003/065* (2013.01); *F04D 29/422* (2013.01)

(58) Field of Classification Search
CPC .... F04D 29/422; F04D 29/4226; F04D 25/08; F04D 29/441; B60H 1/00471; B60H 2001/006; B60H 3/0608; B60H 2003/065
USPC ... 415/119, 121.2, 183–185, 191, 208.2, 225
See application file for complete search history.

(56) References Cited

U.S. PATENT DOCUMENTS

| | | | | |
|---|---|---|---|---|
| 3,019,963 | A * | 2/1962 | Eck | F04D 15/00 415/144 |
| 6,193,478 | B1 | 2/2001 | Lin et al. | |
| 7,374,398 | B2 * | 5/2008 | Marchese | F04D 29/4213 415/189 |
| 2006/0291999 | A1 * | 12/2006 | Han | F04D 29/4213 415/121.2 |
| 2011/0023526 | A1 * | 2/2011 | Ohyama | F04D 29/30 62/426 |

FOREIGN PATENT DOCUMENTS

| | | | |
|---|---|---|---|
| DE | 202005012569 U1 | 10/2006 | |
| EP | 0608034 A1 * | 7/1994 | ......... B01D 46/0005 |
| JP | H1182394 A | 3/1999 | |

OTHER PUBLICATIONS

English abstract for DE-202005012569.
English abstract for DE-4115171.
English abstract for DE-4230014.
English abstract for JP-11082394.
German Search Report for DE-10 2014 226 298.4, dated Nov. 24, 2015.

* cited by examiner

FAN INCLUDING AT LEAST ONE COVER ELEMENT

CROSS-REFERENCE TO RELATED APPLICATIONS

This application claims priority to German Patent Application No. 10 2014 226 298.4, filed Dec. 17, 2014, the contents of which are hereby incorporated by reference in its entirety.

TECHNICAL FIELD

The present invention concerns a fan for generating a gas flow. The invention also concerns an air-conditioning system equipped with such a fan for conditioning an air flow.

BACKGROUND

A generic fan is known from DE 20 2005 012 569 U1. It comprises a housing in which a pressure chamber and a suction chamber are formed, which are open to each other via a connecting opening. Furthermore, an impeller is provided which has an axial suction side arranged in the connecting opening and a radial pressure side arranged in the pressure chamber. Furthermore, an inlet for supplying a gas flow to the suction chamber and an outlet for discharging the gas flow from the pressure chamber are formed in the housing. In the known fan, the impeller is also arranged eccentrically in the pressure chamber so that the pressure chamber is configured as a spiral outside the pressure side of the impeller. Furthermore, the pressure chamber transforms tangentially into the outlet. Finally, a fan tongue is formed on the housing between the pressure chamber and the outlet.

During operation of the fan, the impeller draws in gas from the suction chamber and delivers it to the pressure chamber. This creates a gas flow. This gas flow may lead to acoustic interactions between the impeller and the fan components exposed to the gas flow. In particular, undesirable noise may be generated. The design of the fan tongue allows a significant reduction in the noise development. It has however been found that even simple changes to the fan affect the guidance of the gas flow in the fan, and thus in particular influence the noise development. So even minor modifications to the fan may require a complex revision of the fan tongue in order to bring the noise development back to a tolerable level. There is therefore a need for additional sound reduction measures in order for example to simplify an adaptation of the fan to varying installation situations.

It is known from the above-mentioned DE 20 2005 012 569 U1 to create a surround for the connecting opening from a sound-absorbing material. Furthermore, a wall opposite the connecting opening may be made of sound-absorbing material. Also, a wall surrounding the pressure chamber in the peripheral direction may be made of a sound-absorbing material. The implementation of these sound-insulating measures is however comparatively complex. Also, these measures are only effective in the higher frequency range of the disruptive noise. In order to reduce the disruptive noise in the low frequency range too, it is still necessary to modify the fan tongue.

A further sound-damped fan is known for example from DE 41 15 171 C2, in which the pressure chamber is separated by perforated walls from absorption chambers in which a sound-deadening medium is arranged.

SUMMARY

The present invention deals with the problem of specifying an improved design for a fan of the type cited initially, or for a correspondingly equipped air-conditioning system, which is distinguished in particular by a reduced noise development while remaining simple and economic to produce.

This problem is achieved according to the invention by the subject of the independent claim(s). Advantageous embodiments are the subject of the dependent claims.

The present invention is therefore based on the general concept of providing at least one cover element in the inlet, i.e. axially spaced from the connecting opening, in particular at the transition to the suction chamber, which element covers a part of the flow cross-section of the inlet. In other words, the entire flow cross-section of the inlet available for the supply of the gas flow to the suction chamber is partially covered by at least one cover element, in order to increase locally the flow resistance in the flow cross-section. In this way the distribution of the flow into the suction chamber is modified or changed. Since only a comparatively small part of the flow cross-section is covered by the respective cover element, there is only a comparatively small increase in the total flow resistance in the inlet. Even if several cover elements are used in order to cover several parts of the flow cross-section, a substantial proportion of the flow cross-section always remains open, i.e. is not covered by such cover elements. The invention here uses the knowledge that by changing the flow distribution inside the flow cross-section of the inlet, it is possible to influence the acoustic interaction between the rotating impeller and the gas-guiding components of the fan. In particular, it has been found that the noise development of the fan can also be significantly reduced in this way. With regard to the above object, this means that for any modification of the fan which leads to increased noise development, the noise development can be reduced again by fitting at least one such cover element or by changing the position of such a cover element. Thus in a simple and economic manner, for every modified fan, a tolerable noise situation can be restored by use of a corresponding arrangement and/or number and/or configuration of cover elements. If the fan is equipped with a fan cut-off, with the measure described above, there may be no need for a complex adaptation of the fan cut-off.

According to an advantageous embodiment, a filter may be arranged in the inlet for filtering the gas flow. Suitably now the respective cover element is arranged in the inlet between the filter and the suction chamber. With regard to the gas flow downstream of the filter, the respective cover element has a particularly high influence on the gas flow.

The part of the flow cross-section covered by the respective cover element is comparatively small and for example is maximum ⅑. The part of the flow cross-section covered by the respective cover element may however be at least 1/20 or 1/16. Insofar as several cover elements are used, according to a preferred embodiment, the total covered part of the flow cross-section is maximum 50%, preferably maximum 25% of the flow cross-section of the inlet. Insofar as several cover elements are provided, these are suitably arranged spaced apart. The same or different cover elements may be used here.

According to another advantageous embodiment, the respective cover element is configured flat and smooth. In particular, in this way a thickness of the cover element, measured parallel to the flow direction of the gas flow in the inlet, is significantly smaller than a width and a height of the cover element measured transversely to the flow direction. The cover element may be rectangular, in particular square. Also round or irregular geometries are conceivable. According to an advantageous embodiment, the thickness of the cover element is maximum 10% of its height or width. In this way, the respective cover element can easily be integrated while retaining a compact form for the fan.

According to another advantageous embodiment, the respective cover element may lie in a cover plane which extends perpendicular to the rotation axis of the impeller. The rotation axis of the impeller defines the axial direction of the fan which runs parallel to the rotation axis. The radial direction of the fan and the peripheral direction of the fan also relate to the rotation axis. The arrangement of the respective cover element perpendicular to the rotation axis is particularly advantageous if the inlet transforms axially into the suction chamber. Here the inlet as a whole may in principle be oriented axially. It is also conceivable that the inlet transforms axially into the suction chamber substantially only at its outlet end, while at its inlet end it may in principle have any orientation relative to the rotation axis.

In another embodiment, it may be provided that the respective cover element is arranged only in an edge region of the inlet which surrounds, in the peripheral direction, a central region axially aligned with the connecting opening. It has been found that the influence on the gas flow, which also significantly affects the noise development, is achievable primarily in the edge region. Also, the remaining free central region guarantees a low as possible flow resistance at the transition between the inlet and the suction chamber.

In another embodiment, a carrier grid may be arranged in the inlet which, on a side facing the filter, carries the respective cover element. The arrangement of such a carrier grid in the inlet simplifies the attachment of the respective cover element. In particular, such a carrier grid may be structured for example such that, in principle, any suitable position may be set for the respective cover element, for example along the entire above-mentioned edge region. The respective cover element may be fixed to the carrier grid, for example by means of an adhesive connection or solder connection or weld connection. The variable positioning along the carrier grid is necessary for the respective cover element only for the variable formation of the fan, in order to adapt it acoustically to modified peripheral conditions. This adaptation is substantially simplified by the carrier grid.

According to an alternative embodiment which is preferred for series production, the respective cover element may be configured as an integral part of a carrier frame arranged on or in the inlet, such that the carrier frame with the respective cover element is produced from one piece, e.g. as an injection moulding of plastic. In particular, the carrier frame, like the carrier grid mentioned above, may be equipped with a grid structure. Also said carrier grid may form the carrier frame, so that in this case the respective cover element is integrated in the carrier grid. Furthermore, in principle it is conceivable that the respective cover element is formed during series production integrally on a housing part of the housing, whereby no separate carrier frame is required.

In a preferred embodiment, the cover element may have an annular, ellipsoid, rectangular or irregular form. The at least one annular cover element may here also be positioned in the inlet without a carrier frame or carrier grid, e.g. with carrier webs.

In an additional embodiment, at least two annular cover elements may be arranged concentrically or eccentrically to each other.

The above-mentioned optional filter may for example rest axially on the respective cover element, whereby the flow influence of the respective cover element is particularly efficient. In order however not to unnecessarily obstruct the filtration effect, according to another embodiment it may be provided that an axial distance is provided between the filter outlet side and the respective cover element.

According to another embodiment, at least one such cover element may have a closed surface so that the gas flow cannot pass through. For example, the cover element is a sheet of metal or plastic. The closed surface ensures a particularly intensive flow deflection by the respective cover element.

Additionally or alternatively, at least one such cover element may be perforated so that the gas flow can pass through in a choked fashion. For example, such a cover element may be formed from a perforated sheet of metal or plastic. Grid structures are also conceivable. The perforated cover element allows a less drastic intervention in the flow inside the inlet. Different perforations allow further modification of the intervention in the flow or the choke effect.

Suitably, the impeller may be arranged in the pressure chamber so that the pressure chamber is designed as a spiral outside the pressure side of the impeller. This means that the pressure chamber has a cross-section which increases radially in the peripheral direction, so that the pressure chamber cross-section increases in the peripheral direction from a starting region of the pressure chamber to an end region of the pressure chamber. Furthermore, it may be provided that the outlet transforms tangentially into the pressure chamber or the end region of the pressure chamber. In this way, the radial fan has a particularly high efficiency with regard to its delivery power for the gas flow. The fan cut-off arranged on the housing between the pressure chamber and the outlet defines the smallest radial gap between the housing and the impeller in the spiral pressure chamber, so that in the pressure chamber, it divides the outlet from the initial region of the pressure chamber.

According to another embodiment, at least one flow deflection element may be arranged in the suction chamber between the respective cover element and the connecting opening, and may protrude into the flow cross-section of the inlet and cause a deflection of the gas flow. By means of the flow deflection element, the flow through the housing can be significantly influenced, which may also contribute to the desired noise reduction in addition to the respective cover element.

The respective flow deflection element is preferably arranged axially spaced from the cover element. Furthermore, the respective flow deflection element may be arranged offset to the respective cover element in the peripheral direction.

It may advantageously be provided that the respective flow deflection element extends freestanding into the suction chamber and/or extends into the suction chamber so far that it radially overlaps the connecting opening. Insofar as several flow deflection elements are provided, these may be arranged distributed in the peripheral direction, wherein a symmetrical distribution is possible but not essential. Insofar as several flow deflection elements are used, these may be identical or similar. Alternatively, the flow deflection elements may also be different.

According to another embodiment, a filter may be arranged in the inlet for filtering the gas flow, wherein the respective cover element is arranged in the inlet between the filter and the suction chamber. Filtration of the aspirated gas flow also influences the flow through the fan, and consequently also has an effect on the noise development. Depending on the filter used, therefore, the position and/or number and/or geometry and/or configuration of the respective cover elements may vary.

An air-conditioning system according to the invention for conditioning an air flow, which is preferably provided for a motor vehicle, comprises at least one fan of the type described above for driving the air flow. Furthermore, such an air-conditioning system may comprise at least one heating device for heating the air flow and/or at least one cooling device for cooling the air flow.

Further important features and benefits of the invention arise from the subclaims, the drawings and the associated description of the figures with reference to the drawings.

It is understood that the features cited above and to be explained further below may be used not only in the combination given, but in any combination or alone, without leaving the scope of the present invention.

Preferred exemplary embodiments of the invention are depicted in the drawings and explained in more detail in the description below, wherein the same reference numerals refer to the same or similar or functionally equivalent components.

DETAILED DESCRIPTION

Figure 1:
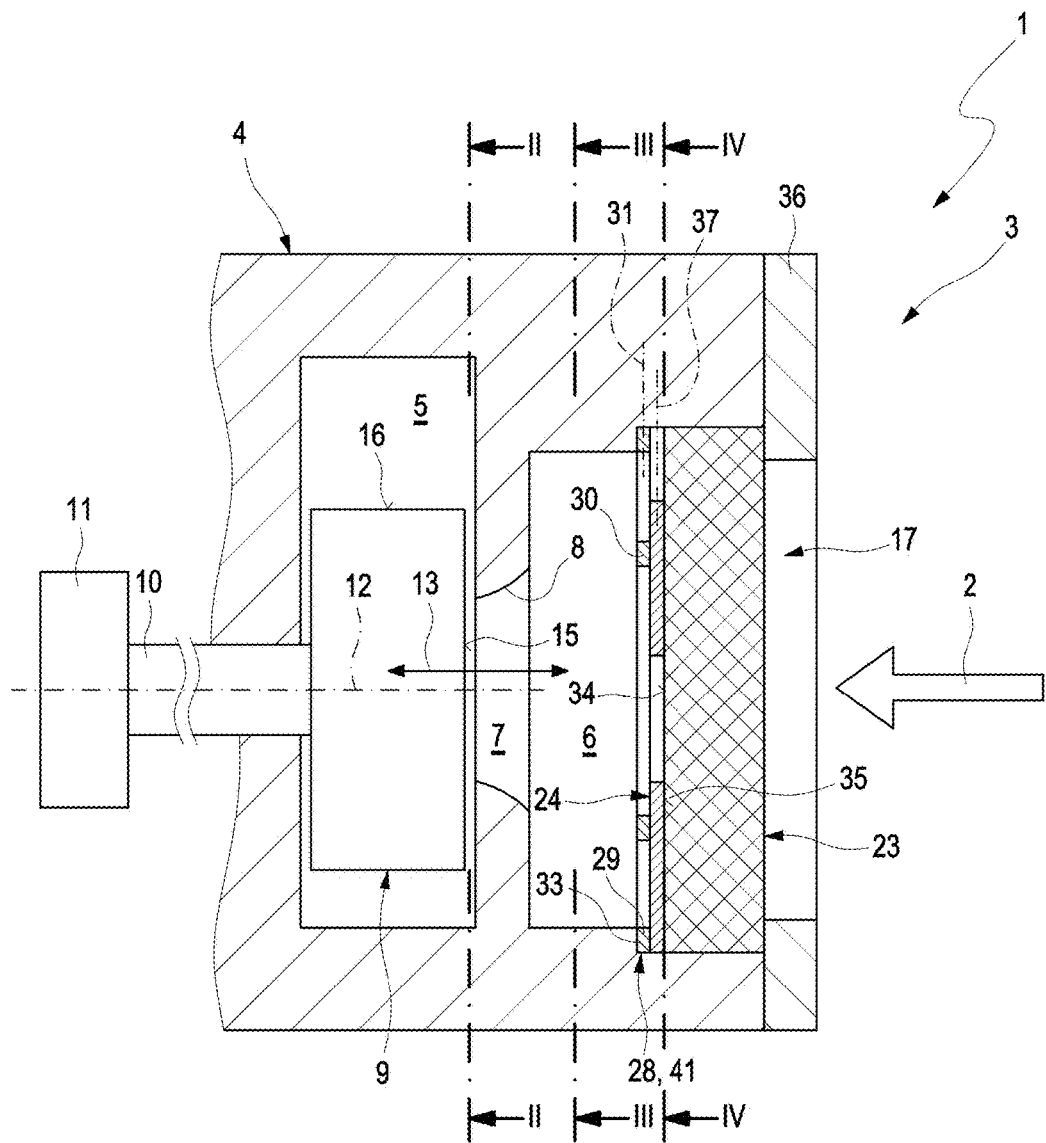
FIG. 1 a greatly simplified axial section of an air-conditioning system in the region of a fan, FIG. 2 a cross-section along section line II in FIG. 1 of the fan, FIG. 3 a cross-section along section line III in FIG. 1 of the fan, FIGS. 4 to 8 cross-sections along section line IV in FIG. 1 of an inlet of the fan in various embodiments.

According to FIG. 1, an air-conditioning system 1, which serves to condition an air flow 2 and is preferably used in a motor vehicle, comprises at least one fan 3 for driving the air flow 2, which may also generally be known as a gas flow 2. The air-conditioning system 1 also comprises at least one heating device (not shown here), and/or at least one cooling device (not shown here), for heating and/or cooling the air flow 2.

The fan 3 comprises a housing 4 which contains a pressure chamber 5 and a suction chamber 6. Between the pressure chamber 5 and the suction chamber 6, a connecting opening 7 is formed in the housing 4 which connects the two chambers 5, 6 fluidically together. In particular, the pressure chamber 5 and the suction chamber 6 are open to each other in the connecting opening 7. In this example, the connecting opening 7 has a nozzle contour 8 which converges in a flow direction oriented away from the suction chamber 6 towards the pressure chamber 5. This nozzle contour 8 has a greater cross-section at the inlet to the connecting opening 7 than at the outlet from the connecting opening 7. The two cross-sections are shown as two concentric circles in FIGS. 3 to 8.

An impeller 9 is also arranged in the housing 4 and configured as a radial impeller. The impeller 9 is connected via a drive shaft 10 to a drive motor 11, which drives the impeller 9 in operation of the fan 3 so that it rotates about a rotation axis 12. The rotation axis 12 defines an axial direction 13 of the fan 3 which runs parallel to the rotation axis 12. A peripheral direction 14 indicated by a double arrow in FIG. 2, and a radial direction (not shown in detail) relate to this axial direction 13. The impeller 9 has an axial suction side 15 which is arranged at the connecting opening 7. In principle, the suction side 15 may also protrude axially into the connecting opening 7. Furthermore, the impeller 9 has a radial pressure side 16 located in the pressure chamber 5. In operation of the fan 3, the impeller 9 at its suction side 15 draws in air from the suction chamber 6 so that the air flow 2 enters the impeller 9 through the suction side 15. At the pressure side 16, the air flow 2 is expelled from the impeller 9 and delivered or pressed into the pressure chamber 5.

Figure 2:
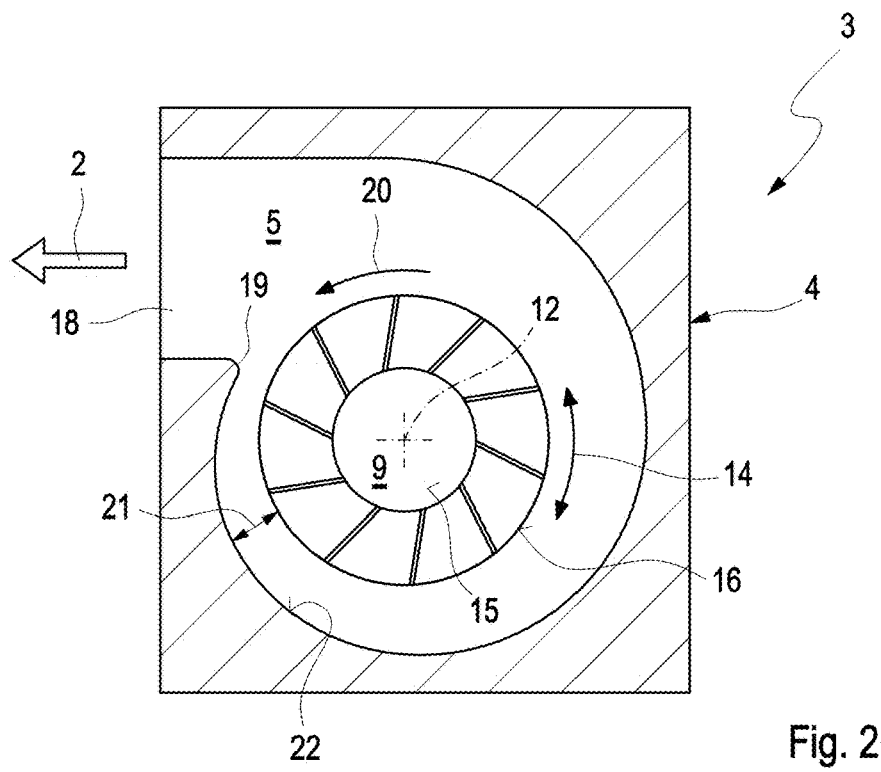

An inlet 17 is also formed in the housing 4, through which the gas flow 2 reaches the suction chamber 6. Furthermore, the housing 4 according to FIG. 2 has an outlet 18 through which the gas flow 2 can escape from the pressure chamber 5. As also shown in FIG. 2, the impeller 9 is arranged in the pressure chamber 5 so that outside the pressure side 16 of the impeller 9, the pressure chamber 5 has a spiral contour in cross-section perpendicular to the rotation axis 12. In particular, the impeller 9 is arranged eccentrically to this in the pressure chamber 5. Furthermore, the outlet 18 is arranged so that the pressure chamber 5 transforms tangentially into the outlet 18. Also, a fan cut-off 19 is formed on the housing 4, namely at a transition between the pressure chamber 5 and the outlet 18. A rotation direction 20 of the impeller 9 is suitably oriented so that at its outer periphery, i.e. on its pressure side 16, in the region of the outlet 18, the impeller 9 moves in the direction towards the fan cut-off 19. In this rotation direction 20, a radial distance 21 or radial gap 21 between the pressure side 16 of the impeller 9 and a wall 22 radially delimiting the pressure chamber 5 also increases. In the pressure chamber 5, the fan cut-off 19 separates the starting region of the pressure chamber 5, at which the radial gap 21 is relatively small, from an end region of the pressure chamber 5, at which the radial gap 21 is relatively large and which transforms into the outlet 18. To this extent, in the housing 4 the fan cut-off 19 also separates the outlet 18 from the starting region of the pressure chamber 5.

According to FIG. 1, suitably a filter 23 is arranged in the inlet 17, through which the air flow 2 passes and is filtered. Furthermore, at least one cover element 24 is arranged in the inlet 17 between the filter 23 and the suction chamber 6, such that it at least partially covers a flow cross-section of the inlet 17 designated 25 in FIGS. 3 to 8. The respective cover element 24 thus causes a local blockade or choking of the flow section 25 in a carefully selected part of the flow cross-section 25. According to FIGS. 1 and 4 to 8, the respective cover element 24 is formed flat and smooth. It lies in a cover plane 37 running perpendicular to the rotation axis 12.

Figure 3:
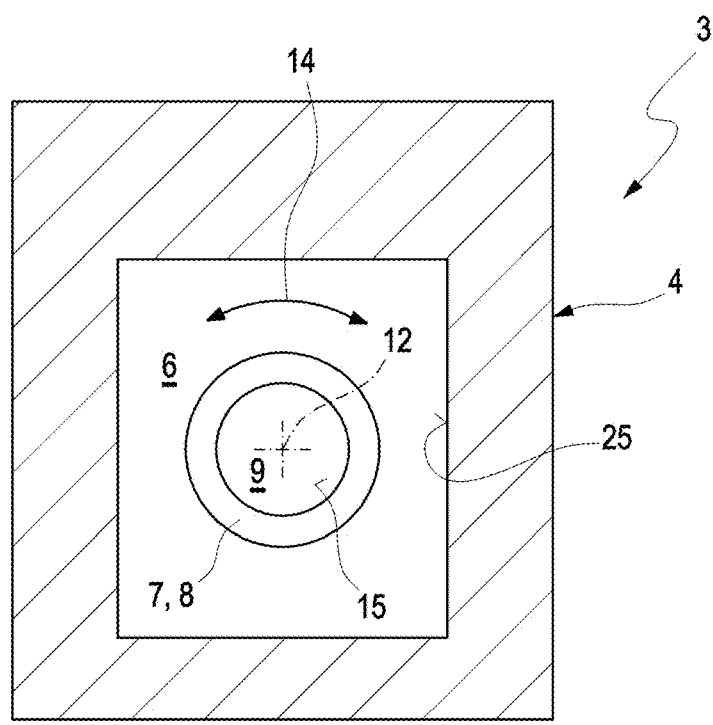

The section plane III-III of the cross-section shown in FIG. 3, relative to the flow direction of the air flow 2, is located downstream of the filter 23 and downstream of the respective cover element 24, so that FIG. 3 forms a top view onto the housing 4 in the region of the suction chamber 4, and the suction side 15 of the impeller 9 can be seen through the connecting opening 7. In contrast, in FIGS. 4 to 8 the respective section plane IV-IV is positioned upstream of the respective cover element 24, so that there is also a view of the inlet 17 and the flow cross-section 25 can be seen. Similarly, the connecting opening 7 and the suction side 15 of the impeller 9 can be seen. The section plane IV-IV as indicated in FIG. 1 may be positioned precisely at the border between the filter 23 and the cover element 24. It is also conceivable that the filter element 23 has been omitted in FIGS. 4 to 8, in order to allow the axial view shown.

In the examples of FIGS. 4 to 6 and 8, two cover elements 24 are provided. In the example of FIG. 7 however, only a single cover element 24 is provided. It is also conceivable that more than two cover elements 24 may be provided. In the examples of FIGS. 4 to 6 and 8, the cover elements 24 are arranged exclusively in an end region 26 of the inlet 17 which extends closed in the peripheral direction 14. The edge region 26 thus surrounds a central region 27 of the inlet 17 which aligns axially with the connecting opening 7. Thus the connecting opening 7 lies largely inside the central region 27. In other words, the cover elements 24 do not extend as far as the central region 27 and thus in particular cause no covering, or at least no substantial covering, in any case only an edge-side covering, of the connecting opening 7 in the axial projection shown in FIGS. 4 to 6 and 8.

For easier positioning of the cover elements 24 in the flow cross-section 25, according to FIGS. 1 and 4 to 6 and 8, a carrier grid 28 may be provided in the inlet 17 which, on a side facing the filter 23, carries the respective cover element 24. This side is facing the observer in FIGS. 4 to 6 and 8. The carrier grid 28 comprises a grid frame 29 which peripherally surrounds the flow cross-section 25. Furthermore, the carrier grid 28 comprises a plurality of grid rods 30 which extend inside the grid frame 29 and form additional support points for the cover elements 24 inside the grid frame 29. On the edge side, the cover elements 24 may lie on the grid frame 29. To fix the cover elements 24 to the grid frame 29, suitable fixing methods may be used, such as for example gluing, soldering and welding. Alternatively, it is advantageous for series production of the fan 3 if the respective cover element 24 is not produced separately from the grid frame 28, but is integrated therein. With such an integral construction, instead of such a grid frame 29, a more simply structured carrier frame 41 may be used which in principle does not have such a grid structure. Preferably, the cover element 24 or cover elements 24 are produced integrally with the carrier frame 41 or carrier grid 28, e.g. as a one-piece or single-material injection moulding made of plastic.

In the embodiment shown in FIG. 1, FIGS. 4 to 6, and FIG. 8, the carrier grid 28 extends in a grid plane 31 which in turn is oriented perpendicular to the rotation axis 12. The flat cover elements 24 lying thereon extend parallel to this. The grid frame 29 and grid rods 30, and also the carrier frame 41, are designed comparatively narrow or thin so they fulfil their supporting or retaining function for the cover elements 24 but have scarcely any effect on the flow cross-section 25.

Figure 4:
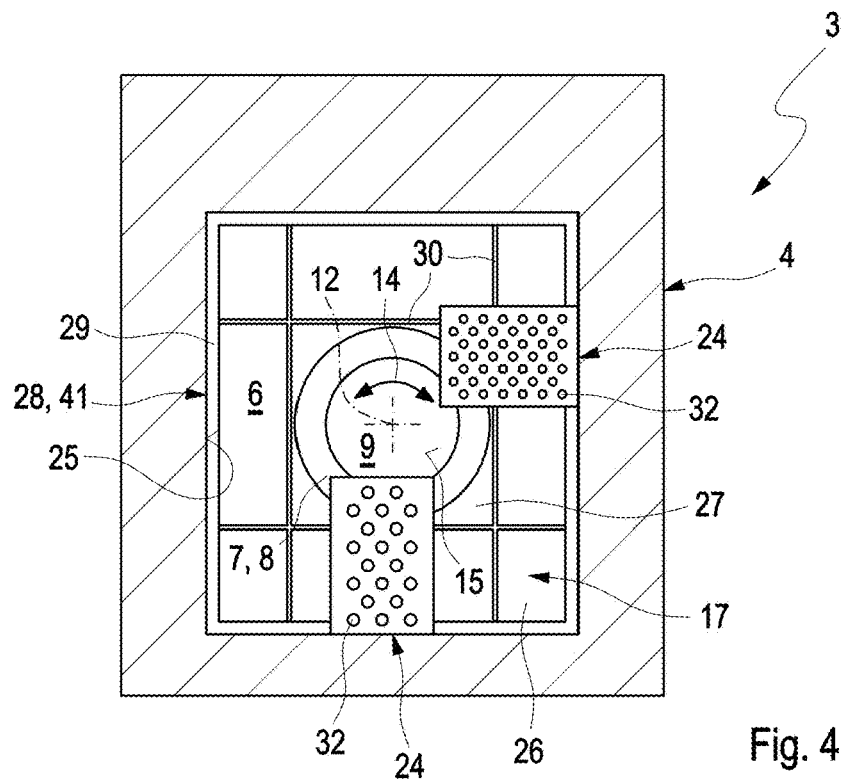

In the embodiment shown in FIG. 4, the two cover elements 24 are each provided with a perforation 32, whereby the gas flow 2 or air flow 2 can flow through the cover elements 24, albeit choked in comparison with the remaining free region of the flow cross-section 25 which is not covered by a cover element 24. Purely as an example, different perforations 32 are shown in FIG. 4, whereby the choke effect of the respective cover plate 24 may be adapted individually.

Figure 5:
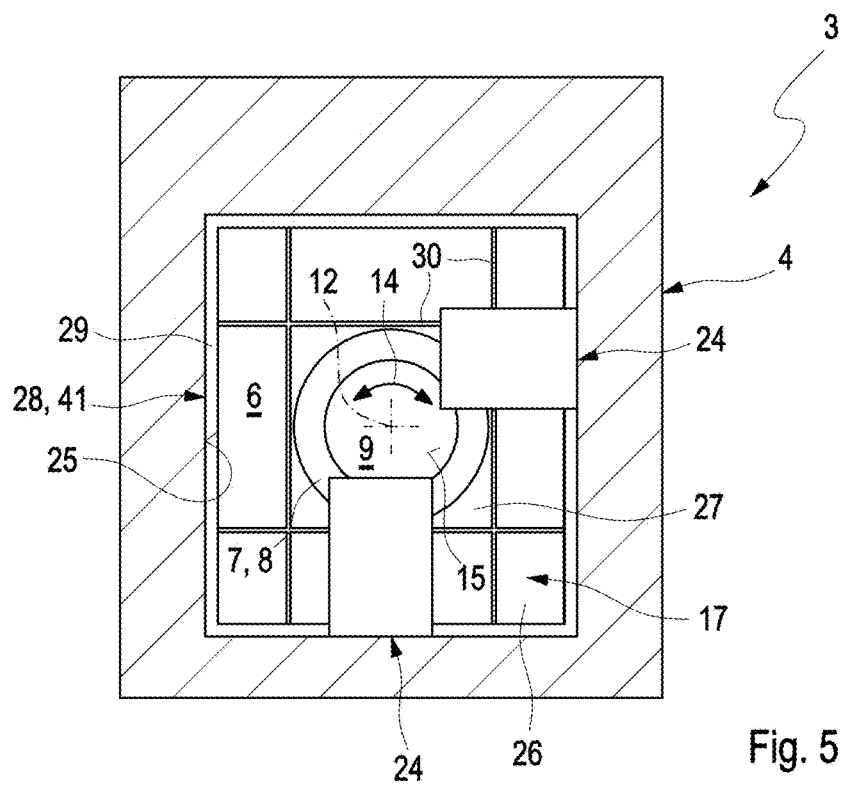

In the embodiment shown in FIG. 5, the two cover elements 24 each have a closed surface so the air flow 2 cannot pass through. This achieves a particularly intensive deflection of the air flow 2.

Figure 6:
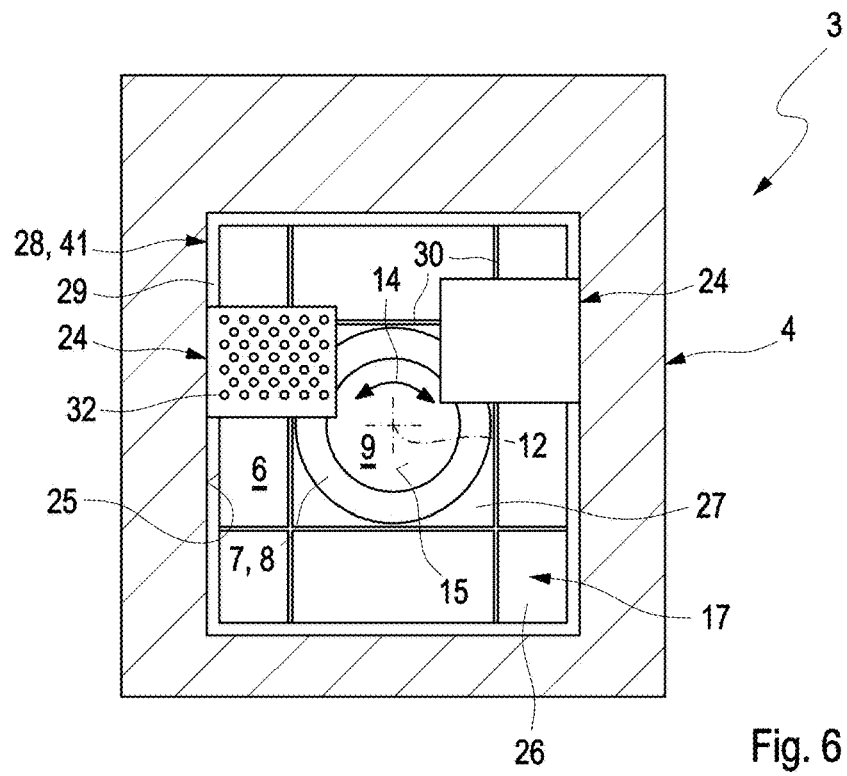
Figure 7:
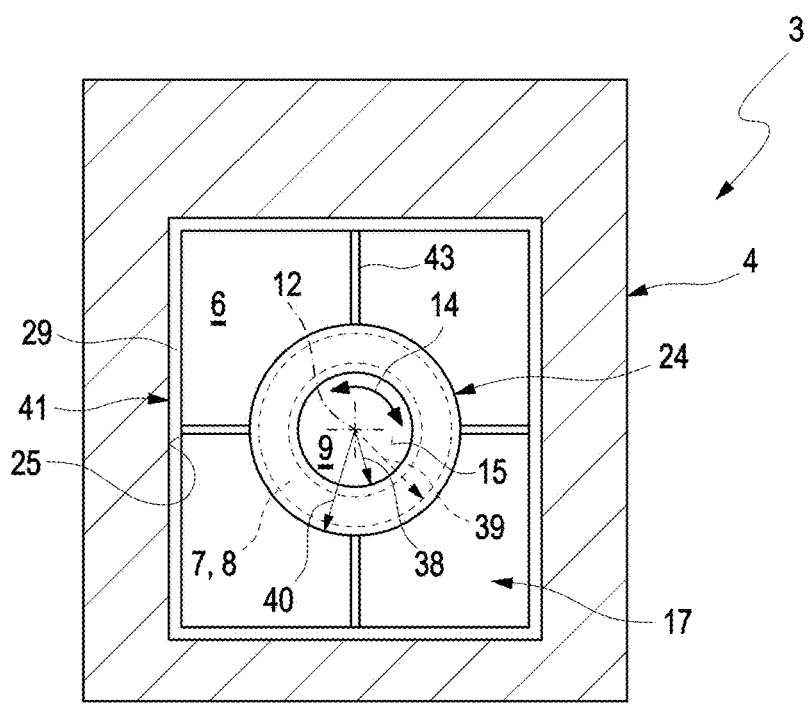

Also, according to FIG. 6, an embodiment is conceivable in which at least one closed cover element 24 and also at least one perforated cover element 24 are used.

As also shown in FIGS. 4 to 6, different positions are conceivable for the cover elements 24, which may be set depending on the respective application. The respective application arises from the different conditions of use and/or peripheral conditions of the respective fan 3. For example, in FIG. 1 an axial flow of the air flow 2 to the suction chamber 6 is indicated. In another embodiment, this flow may be angled relative to the axial direction. In particular, the air flow 2 may also enter the suction chamber 6 radially. The positioning of the at least one cover element 24 depends for example on this spatial orientation of the flow; also other parameters, such as for example the available flow cross-section and its geometry, may lead to a changed flow within the fan 3, wherein an accompanying change in noise development can be compensated by a correspondingly adapted positioning and/or arrangement of the at least one cover element 24.

In the embodiment shown in FIG. 1, the housing 4 has a step 33 which serves as an axial support for the carrier grid 28 or the carrier frame 41 where applicable. Furthermore, here the filter 23 is positioned so that its outlet side 34 makes contact with the respective cover element 24. Suitably however, in another embodiment, a position for the filter 23 may be proposed in which there is an axial distance between the outlet side 34 of the filter 23 and a flow contact side 35 of the cover elements 24 facing the filter 23. To fix the filter 23 in the housing 4, a cover plate 36 is here also provided.

According to FIG. 7, an annular cover element 24 may also be used, which is arranged concentrically or coaxially to the rotation axis 12 of the impeller 9. Also, several annular cover elements 24 may be provided which are arranged concentrically to each other. In the example, the annular cover element 24 is configured as a circular ring so it has an inner radius 38 and an outer radius 40. The dimensioning of the cover element 24 is selected here such that it covers the connecting opening 7 on the edge side. In particular, an opening radius 39 of the also circular connecting opening 7 is greater than the inner radius 38 and smaller than the outer radius 40. The annular cover element 24 is supported or held on the housing 4, and positioned in the desired position, by means of a plurality of carrier webs 43. The carrier webs 43 may be provided either separately from the cover element 24 and attached suitably thereto, or may be formed integrally thereon. Also, a carrier frame 41 may again be provided, on which the carrier webs 43 are formed.

Figure 8:
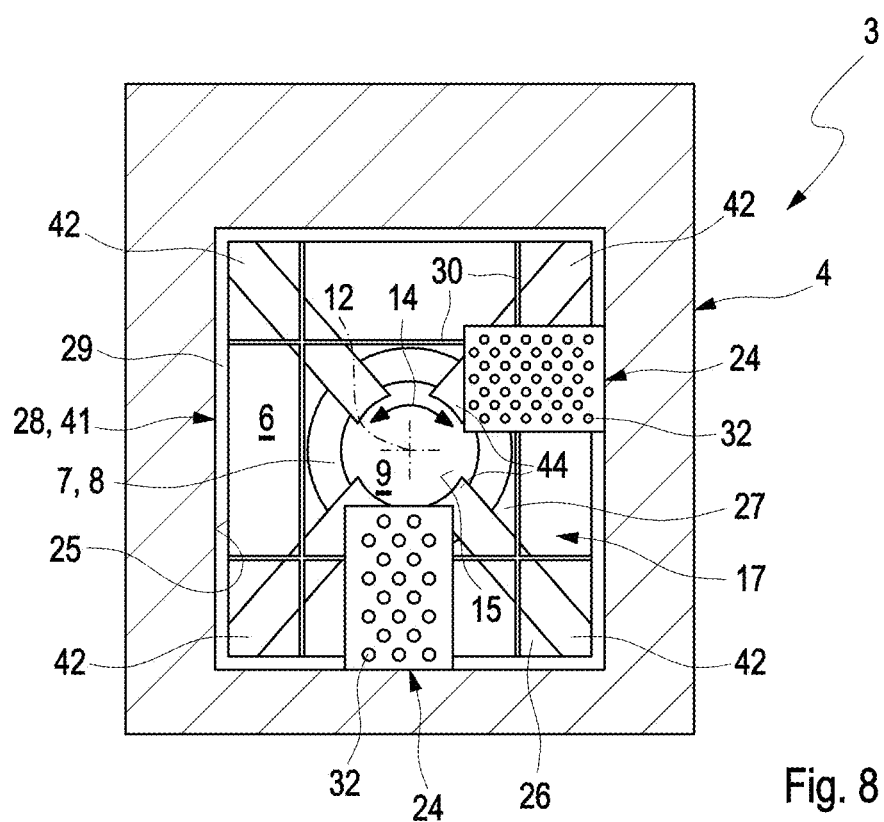

According to FIG. 8, in addition to the cover elements 24, at least one flow deflection element 42 may be provided which is arranged in the suction chamber 6 between the connecting opening 7 and the cover elements 24. In this example, several flow deflection elements 42 are shown which are arranged evenly distributed in the peripheral direction 14 and which are here also configured identically. The flow deflection elements 42 extend at the side, free-standing, into the suction chamber 6 so far that their free-standing end 44 lies inside the connecting opening 7 in the axial projection shown. This gives a radial overlap of the connecting opening 7 by the flow deflection elements 42. The flow deflection elements 42 may be formed as aerodynamically curved vanes, whereby they achieve a particularly efficient flow deflection. In a particularly advantageous embodiment, the at least one flow deflection element 42 is configured and/or arranged to act on the air flow 2 with a twist, in particular in the rotation direction 20 of the impeller 9, in order thus to reduce the flow resistance of the fan 3. In the view of FIG. 8, the flow deflection elements 42 are arranged behind the carrier grid 28 or behind carrier frame 41 and axially spaced therefrom. Furthermore, the flow deflection elements 42 are arranged axially spaced from the connecting opening 7 in the suction chamber 6. Alternatively, the flow deflection elements 42 may also extend as far as the connecting opening 7 or protrude into the connecting opening 7.

The invention claimed is:

1. A fan for generating a gas flow for an air-conditioning system, comprising:

a housing including a pressure chamber and a suction chamber, the pressure chamber and the suction chamber being open to each other via a connecting opening;

an impeller having a rotation axis and including an axial suction side arranged at the connecting opening and a radial pressure side arranged in the pressure chamber;

an inlet disposed in the housing for supplying the gas flow to the suction chamber, the inlet defining a flow cross-section radially delimited by an edge surrounding the inlet in a peripheral direction of the rotation axis;

an outlet disposed in the housing for discharging the gas flow from the pressure chamber;

a fan cut-off disposed on the housing between the pressure chamber and the outlet;

at least one cover element disposed in the inlet and axially spaced from the connecting opening, the at least one cover element extending radially inwards of the edge and transversely to a gas flow direction;

a support grid arranged in the inlet, wherein the support grid mounts the at least one cover element on a side opposite of the connecting opening;

wherein the at least one cover element is arranged locally in the flow cross-section radially offset from the rotation axis and covers part of the flow cross-section of the inlet; and wherein the at least one cover element includes at least two cover elements arranged locally in the inlet and mounted on the support grid, wherein the at least two cover elements are disposed radially offset from the rotation axis and spaced apart from one another in the peripheral direction.

2. The fan according to claim 1, wherein at least one of the at least two cover elements is configured flat and even.

3. The fan according to claim 1, wherein at least one of the at least two cover elements is arranged on a cover plane extending perpendicular to the rotation axis of the impeller and transversely to the gas flow direction.

4. The fan according to claim 1, wherein at least one of the at least two cover elements is arranged only in an edge region of the inlet defined radially between the edge and a central region of the inlet disposed axially aligned with the connecting opening, the edge region surrounding the central region in the peripheral direction.

5. The fan according to claim 4, wherein the at least one of the at least two cover elements is arranged locally in the edge region of the inlet and covers 50% or less of the flow cross-section to facilitate locally increasing a flow resistance in the flow cross-section.

6. The fan according to claim 1, wherein the support grid extends flat and perpendicular to the rotation axis of the impeller, the support grid including a grid frame peripherally surrounding the flow cross-section and a plurality of transverse grid rods extending radially inwards from the grid frame.

7. The fan according to claim 1, wherein the support grid includes a support frame peripherally surrounding the flow cross-section and the at least two cover elements are disposed integrally on the support frame, and wherein the support frame is attached to the housing and positions the at least two cover element in the inlet.

8. The fan according to claim 1, wherein at least one of the at least two cover elements has a closed surface blocking a through-flow of the gas flow.

9. The fan according to claim 1, wherein at least one of the at least two cover elements is perforated and configured to choke a through-flow of the gas flow.

10. The fan according to claim 1, wherein:
the impeller is arranged in the pressure chamber and is configured to define a spiral geometry of the pressure chamber outside of the pressure side of the impeller; and
the outlet transitions tangentially into the pressure chamber.

11. The fan according to claim 1, further comprising at least one flow deflection element arranged in the suction chamber axially between the at least two cover elements and the connecting opening, wherein the at least one flow deflection element protrudes into the flow cross-section of the inlet and has a surface configured to facilitate a deflection of the gas flow.

12. The fan according to claim 11, wherein at least one of:
the at least one flow deflection element is structured to overhang into the suction chamber;
the at least one flow deflection element extends into the suction chamber an extent such that it radially overlaps the connecting opening; and
the at least one flow deflection element is an aerodynamically curved vane.

13. The fan according to claim 1, further comprising a filter arranged in the inlet for filtering the gas flow, wherein the at least two cover elements are arranged in the inlet between the filter and the suction chamber such that an outlet side of the filter is arranged upstream of a flow contact side of the at least two cover elements with respect to the gas flow direction.

14. An air-conditioning system for conditioning a gas flow, comprising:
at least one fan for driving the gas flow, wherein the at least one fan includes:
a housing including a pressure chamber and a suction chamber, the pressure chamber and the suction chamber being open to each other via a connecting opening;
an impeller having a rotation axis and including an axial suction side arranged at the connecting opening and a radial pressure side arranged in the pressure chamber;
an inlet disposed in the housing and defining a flow cross-section for supplying the gas flow to the suction chamber in a gas flow direction;
an outlet disposed in the housing for discharging the gas flow from the pressure chamber;
a fan cut-off disposed on the housing between the pressure chamber and the outlet;
at least one cover element arranged in the inlet and disposed axially spaced from the connecting opening, the at least one cover element defining a flat flow contact side arranged radially extended in the flow cross-section of the inlet transversely to the gas flow direction that covers part of the flow cross-section of the inlet to locally block the gas flow;
a support grid arranged in the inlet and configured to mount the at least one cover element on a side facing away from the connecting opening, the support grid including a frame surrounding the flow cross-section in a peripheral direction of the rotation axis, wherein the at least one cover element is mounted on the support grid radially extended inwards from the frame;
wherein the at least one cover element has a thickness in an axial direction of the rotation axis that is smaller than a width and a height of the at least one cover element running transversely to the axial direction, and wherein the flat flow contact side of the at least one cover element has a closed surface to locally block the gas flow through the flow cross-section; and wherein the at least one cover element includes at least two cover elements arranged locally in the inlet and mounted on the support grid, wherein the at least two cover elements are disposed radially offset from the rotation axis and spaced apart from one another in the peripheral direction.

15. The air-conditioning system according to claim 14, wherein the at least two cover elements are arranged only in a radially outer edge region of the inlet, and wherein the radially outer edge region surrounds in the peripheral direction a central region of the inlet axially aligned with the connecting opening.

16. The air-conditioning system according to claim 14, wherein the at least two cover elements are disposed integrally on the frame of the support grid.

17. A fan for generating a gas flow for an air-conditioning system of a vehicle, comprising:
- a housing including a pressure chamber and a suction chamber, the pressure chamber and the suction chamber being open to each other via a connecting opening;
- an impeller having a rotation axis and including an axial suction side arranged at the connecting opening and a radial pressure side arranged in the pressure chamber;
- an inlet disposed in the housing for supplying the gas flow to the suction chamber in a gas flow direction, the inlet defining a flow cross-section radially delimited by a wall of the housing surrounding the inlet in a peripheral direction of the rotation axis;
- an outlet disposed in the housing for discharging the gas flow from the pressure chamber;
- a fan cut-off disposed on the housing between the pressure chamber and the outlet;
- at least one cover element arranged locally in the inlet, wherein the at least one cover element is axially spaced from the connecting opening and covers a part of the flow cross-section of the inlet;
- a support grid arranged in the inlet and configured to mount the at least one cover element on a side facing away from the connecting opening, the support grid including a grid frame peripherally surrounding the flow cross-section and a plurality of transverse grid rods extending radially inwards from the grid frame;
- wherein the at least one cover element is mounted on the support grid radially extended inwards from the grid frame and transversely to the gas flow direction to locally increase a flow resistance of the gas flow in the flow cross-section; and
- wherein the at least one cover element includes at least two cover elements arranged locally in the inlet and mounted on the support grid, wherein the at least two cover elements are disposed radially offset from the rotation axis and spaced apart from one another in the peripheral direction.

\* \* \* \* \*